United States Patent
Noy et al.

(10) Patent No.: US 12,505,669 B2
(45) Date of Patent: Dec. 23, 2025

(54) VISUAL DETECTION AND PREDICTION OF SENTIMENT

(71) Applicant: Humanising Autonomy Limited, London (GB)

(72) Inventors: Dominic Noy, London (GB); Carlos Serra Magalhães Coelho, Ponta Delgada (PT); Raunaq Bose, London (GB); Leslie Nooteboom, London (GB); Maya Audrey Lara Pindeus, London (GB)

(73) Assignee: Humanising Autonomy Limited (GB)

( * ) Notice: Subject to any disclaimer, the term of this patent is extended or adjusted under 35 U.S.C. 154(b) by 616 days.

(21) Appl. No.: 17/952,062

(22) Filed: Sep. 23, 2022

(65) Prior Publication Data
US 2024/0104926 A1    Mar. 28, 2024

(51) Int. Cl.
*G06V 20/40* (2022.01)
*G06V 10/764* (2022.01)

(52) U.S. Cl.
CPC ............ *G06V 20/41* (2022.01); *G06V 10/764* (2022.01)

(58) Field of Classification Search
CPC .............................. G06V 20/41; G06V 10/764
See application file for complete search history.

(56) References Cited

U.S. PATENT DOCUMENTS 8,284,990 B2 * 10/2012 Ma .................. G06Q 50/01
348/169

OTHER PUBLICATIONS

Kollias, Dimitrios, et al. "Deep affect prediction in-the-wild: Aff-wild database and challenge, deep architectures, and beyond." International Journal of Computer Vision 127.6 (2019): 907-929. (Year: 2019).*

Antoniadis, P. et al., "An audiovisual and contextual approach for categorical and continuous emotion recognition in-the-wild," 2021 IEEE/CVF International Conference on Computer Vision Workshop, Oct. 11, 2021, pp. 3638-3644.

Kollias, D. et al., "Aff-Wild2: Extending the Aff-Wild Database for Affect Recognition," arXiv:1811.07770, Dec. 13, 2019, pp. 1-8.

PCT International Search Report and Written Opinion, PCT Application No. PCT/IB2023/000555, Feb. 13, 2024, 16 pages.

* cited by examiner

*Primary Examiner* — Utpal D Shah
(74) *Attorney, Agent, or Firm* — Klarquist Sparkman, LLP

(57) ABSTRACT

A system and a method are disclosed for detecting a sentiment based in part on visual data. The system receives visual data of an environment generated by one or more sensors, accesses a sequence of AI models. Outputs of earlier models in the sequence act as inputs to one or more later models in the sequence. The sequence of AI models includes one or more frame-based models and one or more temporal-based models. The frame-based model is configured to receive the visual data as input, and extract multiple sets of frame-based features associated with the person based in part on the visual data. The temporal-based model is configured to receive the multiple sets of frame-based features as input, and determine a sentiment of the one or more persons based in part on the multiple sets of frame-based features.

12 Claims, 13 Drawing Sheets

VISUAL DETECTION AND PREDICTION OF SENTIMENT

TECHNICAL FIELD

The disclosure generally relates to the field of artificial intelligence (AI), and more particularly relates to applying a sequence of AI models, including a combination of machine learning, statistical, probability, and/or logic models, to visual data to detect sentiments, such as goals, motives, beliefs, intents, traits, social interactions, and/or cognitive states.

BACKGROUND

Streaming data is a series of data generated continuously, often by various data sources, such as sensors, cameras, computers, etc. Unlike historical data, which may be stored and batch processed, it is common to need to process streaming data quickly in order to act on the results in as close to real-time as possible.

By analyzing stream data in real time, unusual events (such as events with corresponding values that deviate from normal values) and/or developing trends may be detected. Such detections may then be used to generate real-time responses. For example, industrial machines, vehicles, and/or farm machinery may include sensors to generate streaming data, and such streaming data may be used to identify anomalies in such machines or vehicles. As another example, servers or databases may generate logs, which is also in the form of streaming data, and such logs may be used to identify anomalies in the servers or databases.

Streaming data may also include visual data. However, due to the volume and complexity of visual data, it is more difficult to process such data in near real time. Further, when the streaming visual data contains various objects, backgrounds, and persons (including bodies and faces), there is added complexity to separate persons from objects and backgrounds.

SUMMARY

The principles described herein introduce a system and a method for using a sequence of artificial intelligence (AI) models (including machine learning models and/or statistic models) to detect or predict a sentiment of a person based in part on visual data of an environment generated by one or more sensors. Such sensors may include (but are not limited to) a camera, a radar, and/or a lidar. The sentiment may include (but is not limited to) a goal, a motive, a belief, an intent, a personality trait and/or a social interaction. The system is configured to receive the visual data, access a sequence of AI models, and apply the sequence of AI models to the received visual data to detect or predict a sentiment, where outputs of earlier models in the sequence act as inputs to one or more later models in the sequence.

The sequence of AI models includes one or more frame-based models and one or more temporal-based models. The one or more frame-based models are configured to receive frames of visual data as input, and extract a plurality of sets of frame-based features associated with each of the one or more persons based in part on the frames of the visual data. Each set of frame-based features in the plurality of sets of frame-based features corresponds to a particular rame of the visual data. The one or more temporal-based models are configured to receive the plurality of sets of frame-based features as input, and detect or predict a sentiment of the one or more persons based in part on the plurality of sets of frame-based features.

In some embodiments, the one or more frame-based models are applied at a first frequency, and the one or more temporal-based models are applied at a second frequency that is lower than the first frequency. In some embodiments, a higher level model is applied at a frequency that is lower than a lower level model.

In some embodiments, the one or more temporal-based models include a tracking model that is trained to take the one or more frame-based features as input, and to output a movement vector indicating motion of a given keypoint. In some embodiments, the tracking model is further trained to output an identifier of a person based on the plurality of sets of frame-based features. In some embodiments, the one or more temporal-based models further include a semantic model that is trained to take as input the identifier of the person and the movement vector of a keypoint associated with the person, and to output a corresponding behavior of the person. In some embodiments, the one or more temporal-based models further include a social context model that is trained to take as input the behavior of the person, and to output a social context of the person. In some embodiments, the one or more temporal-based models further include a social behavior model that is trained to take as input the social context of the person, or the behavior of the person, and to output a socially meaningful behavior of the person.

In some embodiments, the one or more temporal-based models further include an intent model or a personality trait model that is trained to take as input the social context of the person or the socially meaningful behavior of the person, and to output a sentiment of the person. In some embodiments, the social context model, the social behavior model, the intent model, or the personality trait model further takes location information as an input to generate a corresponding output.

BRIEF DESCRIPTION OF DRAWINGS

The disclosed embodiments have other advantages and features which will be more readily apparent from the detailed description and the accompanying figures (or drawings). A brief introduction of the figures is below.

Figure (FIG. 1A depicts an exemplary environment for a sentiment detection and prediction system, in accordance with one embodiment.

DETAILED DESCRIPTION

Figure 1A:
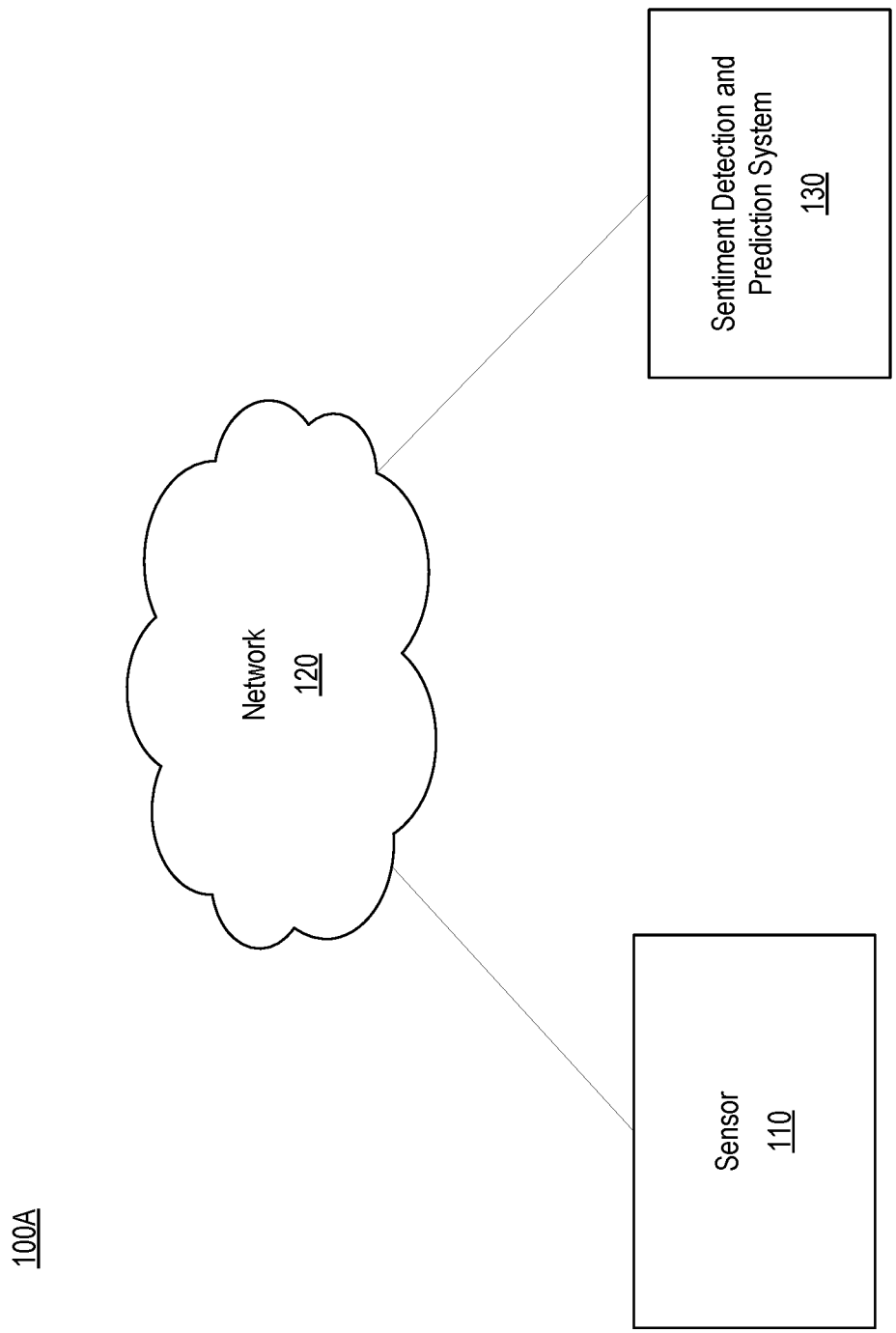
FIG. 1B illustrates another exemplary environment for a sentiment detection and prediction system, in accordance with one embodiment.
FIG. 1C illustrates another exemplary environment for a sentiment detection and prediction system, in accordance with one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Different people in different circumstances will behave differently and show different emotions. Some people are very talkative while others are very quiet. Some people are active while others like to sit or stand in a same area. Also, some people worry or get annoyed more easily than others. For example, when a delivery bot walks by people on a sidewalk, some people may get annoyed while others may feel amused or entertained. These differences may be caused by people's physical and/or mental states at the moments, and/or their personality traits. Further, in a group event, a first person's attitude toward different second persons may also be different which may be based in part on a combination of the first person and the second person's physical and/or mental states and/or their personality traits.

If people's movements and facial expressions can be captured, other people often can tell whether particular social behavior is occurring based thereon, such as whether a person is joking, venting, gossiping, apologizing, etc. Additionally, psychologists may be able to tell a person's intentions, and/or personal traits based in part on people's movements and facial expression, such as whether a person is annoyed or amused.

If people's sentiments (such as goals, motives, beliefs, intents, traits, social interactions, and/or cognitive states) can be identified, manufacturers may be able to improve functions of their products, and/or service providers may be able to improve their services. However, it is difficult to capture and identify people's reactions in real time, and it is even more difficult to determine people's intent and personality trait based on their real time reactions.

Principles described herein solve the above described problem by using a sequence of artificial intelligence (AI) models, including machine learning models and/or statistic models, to analyze visual data to detect people's intents and/or personality traits in near real time. Note, "near real time" means when speed is important for an application, processing time is acceptable for the application. Depending on the application, near real time may be within a second, a few second, a minute, or a few minutes.

Configuration Overview

FIG. 1A depicts an exemplary system environment 100A for a sentiment detection and prediction system, in accordance with one embodiment. Environment 100A includes sensor 110, network 120, and sentiment detection and prediction system 130. Sensor 110 captures visual data of an environment and transmits data via network 120 to sentiment detection and prediction system 130. In some embodiments, sensor 110 may be an image sensor, such as a camera. In some embodiments, sensor 110 may be a distance sensor, such as a radar, a lidar, etc. Responsive to the visual data from the sensor 110, the sentiment detection and prediction system 130 is configured to identify one or more persons in the environment, and detect their intents and/or personality traits based in part on the visual data. The intents and/or personality traits may include (but are not limited to) goals, motives, beliefs, intents, traits, social interactions, and/or cognitive states.

Network 120 may be any data network, such as the Internet. In some embodiments, network 120 may be a local data connection to sensor 110. In one embodiment, network 120 provides the communication channels via which the other elements of the environment 100A communicate. The network 120 can include any combination of local area and/or wide area networks, using both wired and/or wireless communication systems. In one embodiment, the network 120 uses standard communications technologies and/or protocols. For example, the network 120 can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

In some embodiments, sensor 110 may be configured to stream captured visual data to sentiment detection and prediction system 130 continuously. In some embodiments, sensor 110 may be configured to selectively transmit certain visual data to sentiment detection and prediction system 130. For example, in some embodiments, the sensor 110 is configured to detect persons in the environment or in the captured visual data, and only transmit the frames of visual data that contain at least one person.

Sentiment detection and prediction system 130 is configured to use a sequence of AI models to detect or predict a sentiment of a person in the environment based in part on the received visual data. The sentiment may include (but is not limited to) a goal, a motive, a belief, an intent, a personality trait, and/or a social interaction. In some embodiments, the sequence of AI models includes a machine learning model that is trained over a dataset containing labeled visual data.

In some embodiments, the sentiment detection and prediction system 130 is configured to use the sequence of AI models to extract a first set of frame-based features associated with the person from the received visual data. The sentiment detection and prediction system 130 then uses the sequence of AI models to determine a second set of movement features associated with the person based in part on the first set of frame-based features. The sentiment detection and prediction system 130 then uses the sequence of AI models to determine a third set of semantic action features associated with the person based in part on the second set of movement features. The sentiment detection and prediction system 130 then uses the sequence of AI models to determine a fourth set of social behavior features associated with the person based in part on the third set of semantic action features. The sentiment detection and prediction system 130 then uses the sequence of AI models to detect the sentiment of the person based in part on the fourth set of social behavior features. Additional details about sentiment detection and prediction system 130 are further discussed below with respect to FIGS. 2-11.

In some embodiments, sensor 110 may be a standalone device. Alternatively, sensor 110 may be coupled to another computing device, such as a virtual reality headset, a mobile phone, a vehicle, a smart TV, a delivery bot, a smart doorbell, a security system, a safety system, a safety camera (in a work environment, such as a construction site, or a care environment, such as a nursing home), a game console, a coffee maker, and/or any other devices. While only one sensor 110 is depicted, any number of cameras may be operably implemented at same or different locations in the environment and may act independently (e.g., videos/visual data are processed without regard to one another) or in concert (e.g., videos/visual data may be captured in sync with one another and may be stitched together to capture wider views).

Figure 1B:
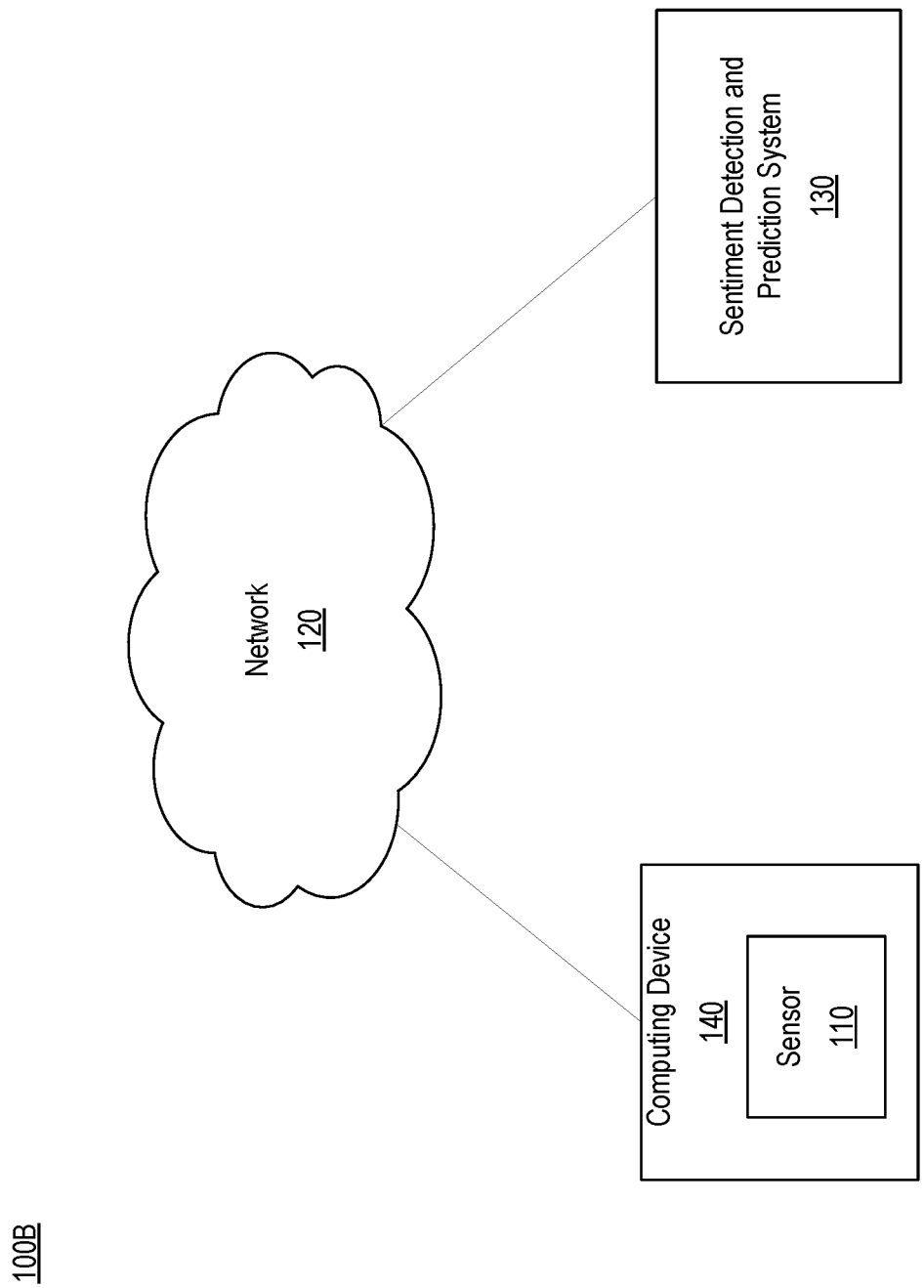

FIG. 1B illustrates another exemplary system environment 100B for a sentiment detection and prediction system, in accordance with one embodiment. In environment 100B, the sensor 110 is coupled to a computing device 140. The computing device 140 is configured to communicate with the sentiment detection and prediction system 130 via network 120. For example, in some embodiments, the computing device 140 is configured to send visual data to sentiment detection and prediction system 130, and the sentiment detection and prediction system 130 is configured to send the detected sentiment back to computing device 140. Computing device 140 may then use the detected sentiment of a person as input to generate additional output. For example, in some embodiments, the computing device 140 may be a smart TV, configured to recommend programs to a user based in part on the detected sentiment of the user received from the sentiment detection and prediction system 130.

Figure 1C:
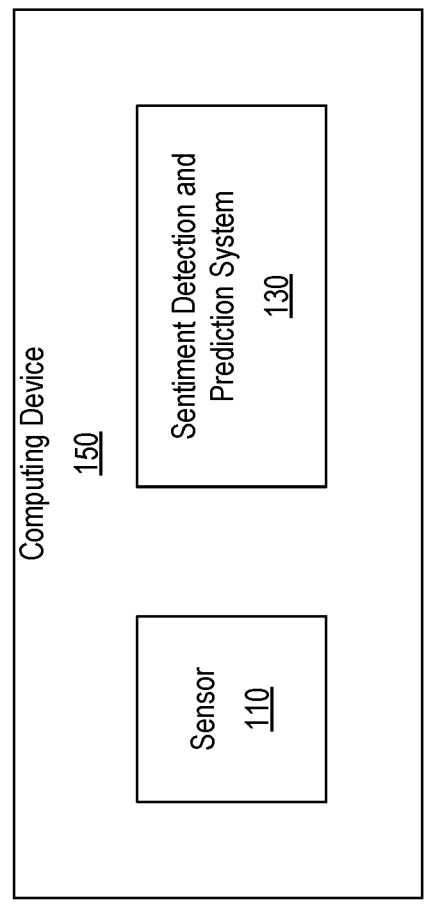

FIG. 1C illustrates another exemplary system environment 100C for a sentiment detection and prediction system, in accordance with one embodiment. In environment 100C, the sentiment detection and prediction system 130 and sensor 110 are both implemented at a computing device 150. For example, the computing device 150 may be a smart coffee maker having a sensor 110 coupled thereto. In some embodiments, the smart coffee maker may be configured to cause the sensor 110 to take pictures of nearby people, detect their sentiment, and intelligently make a coffee room conversation with a user and/or recommend different types of coffees at a different time of a day for different people.

Sentiment Detection and Prediction System

Figure 2:
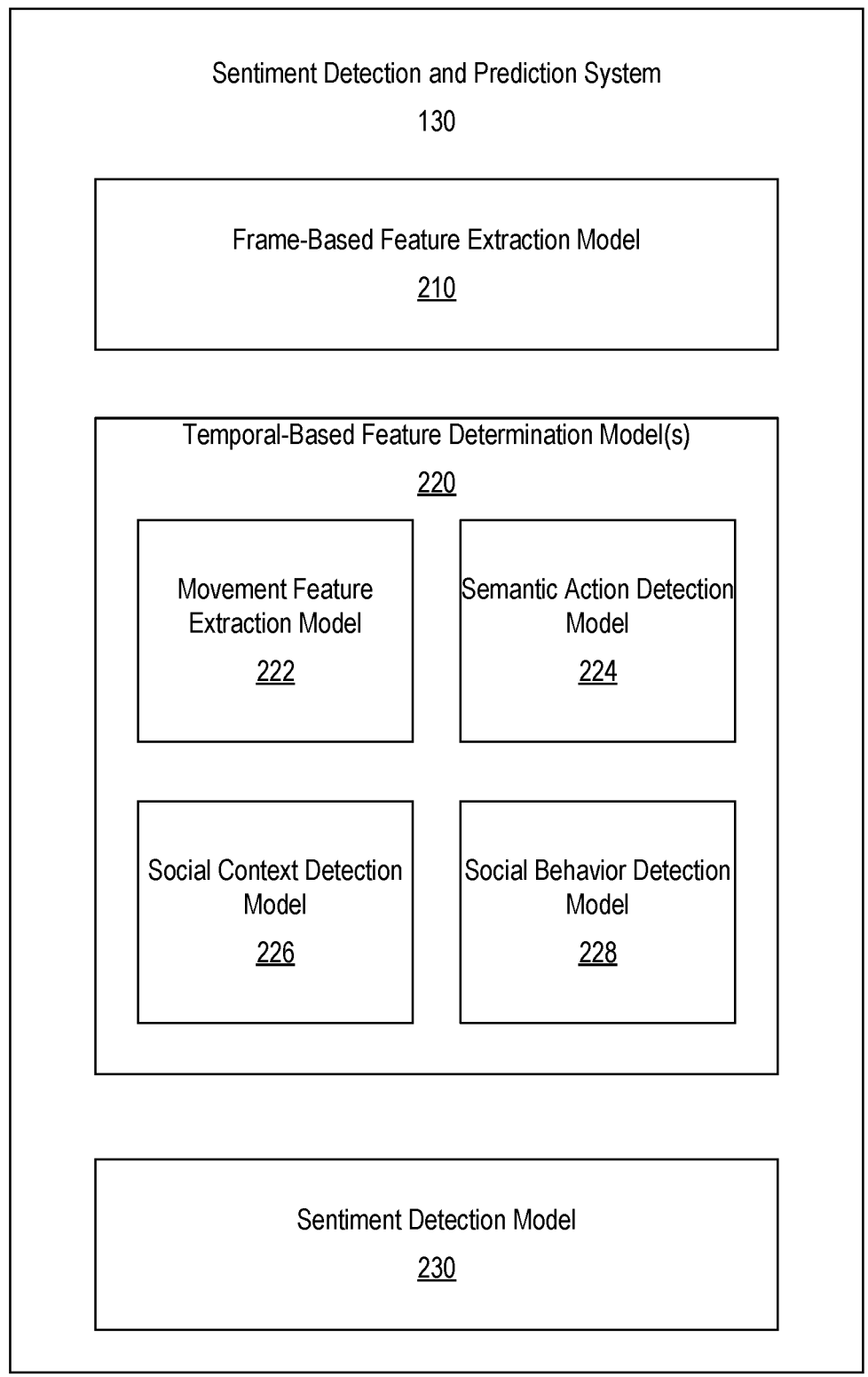
FIG. 2 is a block diagram illustrating components of sentiment detection and prediction system in accordance with an embodiment.

FIG. 2 is a block diagram illustrating components of sentiment detection and prediction system 130 in accordance with an embodiment. The sentiment detection and prediction system 130 includes a sequence of AI models, such as one or more frame-based feature extraction models 210 and one or more temporal-based feature determination models 220. One or more frame-based feature extraction models 210 is configured to use pixels in each image to detect frame-based features, such as (but not limited to) an object feature indicating a detection of an object, a body landmark feature indicating a detection of a body landmark of a person, a facial landmark feature indicating a detection of a facial landmark of a person, a hand landmark features indicating a detection of a hand landmark of a person, a body orientation feature indicating a detection of a body orientation of a person, and/or a distance between two detected features.

The one or more temporal-based feature determination models 220 are configured to determine temporal-based features based in part on the frame-based features. Temporal-based features are related to changes in different frames of visual data. In some embodiments, the one or more temporal-based feature determination models 220 include one or more movement tracking model 222, one or more semantic action detection models 224, one or more social context detection models 226, and/or one or more social behavior detection models 228.

The one or more movement tracking models 222 are configured to generate movement features of persons based in part on the frame-based features generated by the one or more frame-based feature extraction models 210. In some embodiments, the movement features include (but are not limited to) a head motion feature indicating a detection of head motion of a person, a facial motion feature indicating a detection of facial motion of a person, a hand motion feature indicating a detection of hand motion of a person, a finger motion feature indicating a detection of a finger motion of a person, and/or a body posture feature indicating a posture of a person. The posture and/or the change thereof indicates how the body's kinematics have changed over time. In some embodiments, the movement features further include a person identification feature, and a number of people detected feature, which may be computed based in part on the number of faces, body, hands, and/or body orientation identified.

In some embodiments, the one or more semantic action detection models 224 are configured to generate semantic action features based in part on the movement features generated by the one or more movement tracking models 222. In some embodiments, the semantic action features include (but are not limited to) a smiling feature indicating a detection of a smile of a person, a laughing feature indicating a detection of a laugh of a person, an avoiding eye contact feature indicating a detection of an avoiding eye contact of a person, a thumbs up feature indicating a detection of thumbs up gesture by a person, a group formation feature indicating a detection of a group formation of a plurality of persons, and/or other features indicating detection of other meaningful gesticulations.

The one or more social context detection models 226 is configured to generate social context features based in part on the semantic action features generated by the one or more sentiment detection/prediction models 224. In some embodiments, the semantic action features are further based in part on a location or an activity associated with the environment where the visual data is captured. Such semantic action features may include (but are not limited to) an engagement feature indicating a level of engagement of a person, an emotional state feature indicating an emotional state of a person, and/or a turn-taking feature indicating a plurality of persons are taking turns doing something.

The one or more social behavior detection models 228 is configured to generate social behavior features based in part on the semantic action features generated by the one or more sentiment detection/prediction models 224, the social context features generated by the one or more social context detection models 226, and/or a location or an activity associated with the environment where the visual data is captured. Such social behavior features may include (but are not limited to) a joking feature indicating a detection of telling a joke by a person, a venting feature, indicating a detection of venting by a person, a gossip feature indicating a detection of gossiping by a person, and/or an apologizing feature, indicating a detection of apologizing by a person.

In some embodiments, the sentiment detection and prediction system 130 further includes an sentiment detection/prediction model 230. The sentiment detection/prediction model 230 is configured to detect and/or predict a sentiment of a person, such as (but not limited to) a goal, a motive, a belief, an intent, a personality trait and/or a social interaction. For example, the intent may include (but is not limited to) interested, not interested, like, dislike, annoyed, amused, etc. A personality trait may include (but is not limited to) a level of openness, a level of extroversion or introversion, etc.

In some embodiments, the different models 210-230 live in different timescales or are applied at different frequencies. A timescale means a time frame between two sets of visual data that are to be processed. A greater timescale indicates that a model is applied at a lower frequency. For example, a video stream may have a frame rate of 60 Hz. However, for obtaining frame-based features, it may not be necessary to process every image in the video stream. The visual data in the video stream may be down sampled to a timescale, and the down sampled visual data are processed by the frame-based feature extraction model.

In some embodiments, the higher level the model is, the longer the timescale is. As such, a higher level model can run at a much lower frequency. For example, the lowest level model is the frame-based feature extraction models 210; the temporal-based feature determination models 220 are at higher level compared to the frame-based feature extraction model 210; the sentiment detection/prediction model 230 is at higher level than the temporal-based feature detection models 220. Because the characteristics or data points of higher level models do not change as quickly, they remain their meaning over a longer period time. The longer timescales would generally not affect the detection accuracy, but reduce resource consumption and processing power significantly.

Further, in some embodiments, each of the models 210-230 may be used independently, although to understand the social interaction between persons, the outputs of multiple models between multiple persons are generally needed. In some embodiments, the different models 210-230 may not be used in the same order as discussed herein. For example, in some embodiments, certain steps or models may be skipped depending on the applications or use cases.

Figure 3:
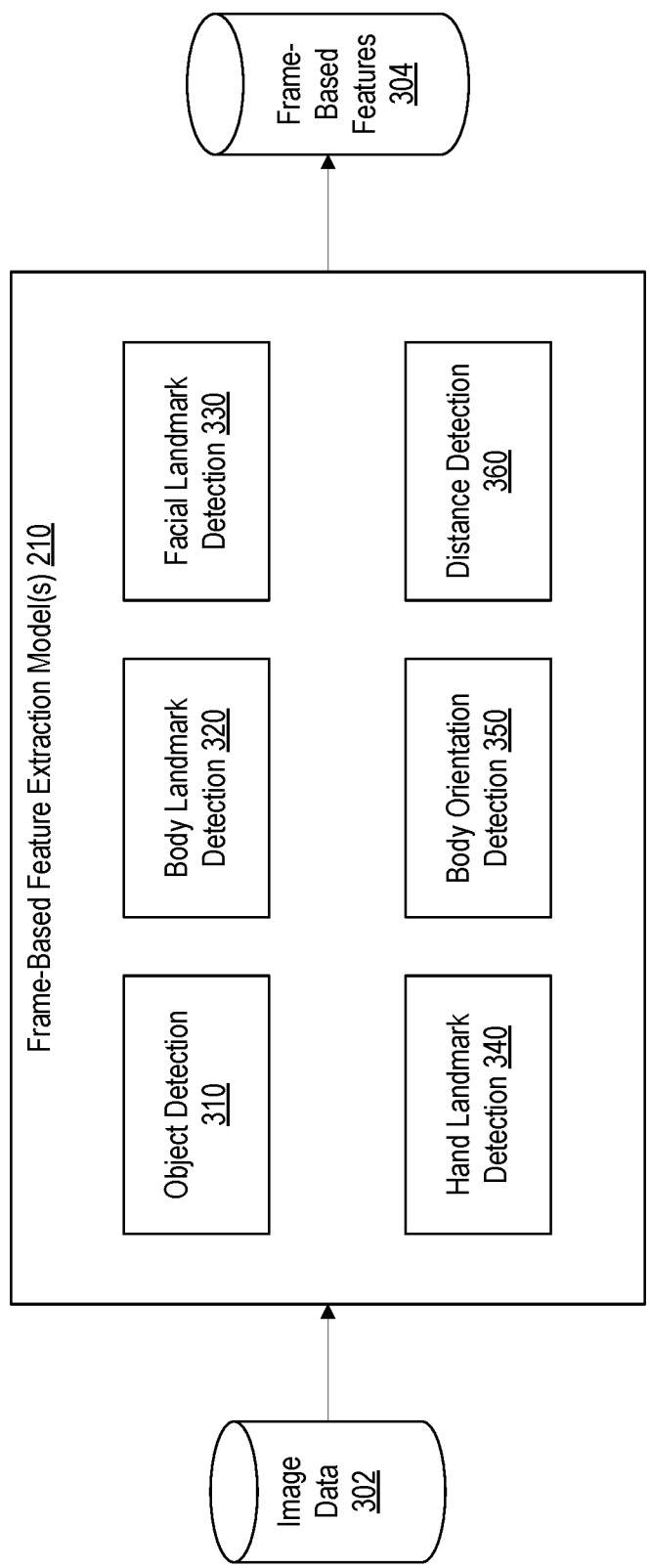
FIG. 3 is a block diagram illustrating components of one or more frame-based feature extraction models in accordance with an embodiment.

FIG. 3 is a block diagram illustrating components of one or more frame-based feature extraction models 210 in accordance with an embodiment. The one or more frame-based feature extraction models 210 is configured to receive visual data 302 (captured by the sensor 110) to generate frame-based features 304. Visual data 302 includes a sequence of visual data, each of which includes a plurality of pixel values. In some embodiments, the one or more frame-based feature extraction models 210 include one or more object detection models 310, one or more body landmark detection models 320, one or more facial landmark detection models 330, one or more hand landmark detection models 340, a body orientation detection model 350, and/or a distance detection model 360.

In some embodiments, the one or more object detection models 310 are trained over a dataset containing a plurality of visual data, each of which is labeled with a class of objects (such as a dog, a cat, a building, a person). The one or more object detection models 310 are trained to take any given image (e.g., visual data taken by the sensor 110) as an input to identify one or more classes of objects. The identified classes of objects are then output as one or more frame-based features 304.

In some embodiments, the one or more body landmark detection models 320 are trained over a dataset containing a plurality of visual data, each of which is labeled with a body landmark (such as a head, a torso, an arm, a leg, a hand, a foot, etc.). The one or more body landmark detection models 320 are trained to take any given image (e.g., visual data taken by the sensor 110) as an input to identify one or more body landmarks. The identified one or more body landmarks are then output as one or more frame-based features 304.

In some embodiments, the one or more facial landmark detection models 330 are trained over a dataset containing a plurality of visual data, each of which is labeled with a facial landmark (such as an eyebrow, an eye, a noise, a mouth, a left/right eyebrow inner/outer point, a left/right eye top/bottom point, a left/right eye pupil, a nose tip point, a left/right nose root point, a left/right nose alar top point, a left/right nose alar out tip point, an upper/under lip top/bottom point, a mouth left point, a mouth right point, etc.). The one or more facial landmark detection models 330 are trained to take any given image (e.g., visual data taken by the sensor 110) as an input to identify one or more facial landmarks. The identified one or more facial landmarks are then output as one or more frame-based features 304.

In some embodiments, the one or more hand landmark detection models 340 are trained over a dataset containing a plurality of visual data, each of which is labeled with a hand landmark (such as a wrist, a thumb carpometacarpal joint, a thumb metacarpophalangeal joint, a thumb interphalangeal joint, a thumb tip, an index finger metacarpophalangeal joint, an index finger proximal interphalangeal joint, an index finger distal interphalangeal joint, an index finger tip, a middle finger metacarpophalangeal joint, a middle finger proximal interphalangeal joint, a middle finger distal interphalangeal joint, a middle finger tip, a ring finger metacarpophalangeal joint, a ring finger proximal interphalangeal joint, a ring finger distal interphalangeal joint, a ring finger tip, a little finger metacarpophalangeal joint, a little finger proximal interphalangeal joint, a little finger distal interphalangeal joint, a little finger tip, etc.). The one or more hand landmark detection models 340 are trained to take any given image (e.g., visual data taken by the sensor 110) as an input to identify one or more hand landmarks. The identified one or more hand landmarks are then output as one or more frame-based features 304.

In some embodiments, the body orientation detection model 350 is trained over a dataset containing a plurality of visual data, each of which is labeled with a degree of orientation (such as 0°, 45°, 90°, 135°, 180°, 225°, 270°, 315°, etc.). The body orientation detection model 350 is trained to take any given image (e.g., visual data taken by the sensor 110) as an input to identify a human body and an orientation thereof. The identified human body and its orientation are then output as one or more frame-based features 304.

In some embodiments, the distance detection model 360 is trained over a dataset containing a plurality of visual data, each of which is labeled with an object and a distance of the object from a camera that has taken the image. The distance detection model 360 is trained to detect a distance from the sensor 110 to an object, a human body, and/or a landmark (identified by the models 310, 320, 330, 340, 350). In some embodiments, the distance detection model 360 is also configured to compute a distance between two objects, human bodies, and/or landmarks. The detected or computed distances are then output as one or more frame-based features 304.

As such, the frame-based features 304 may include (but are not limited to) one or more objects, body landmarks, facial landmarks, hand landmarks, human bodies and their orientations detected from visual data taken by the sensor 110 and their distances from the sensor 110, and/or distances therebetween, using the machine learning models 310, 320, 330, 340, 350, and/or 360. These frame-based features 304 are then taken as input by one or more movement tracking models 222 to generate a second set of movement tracking features.

Note, object detection model 310, body landmark detection model 320, facial landmark detection model 330, hand landmark detection model 340, body orientation detection model 350, and distance detection model 360 illustrated in FIG. 3 are merely a few examples of frame-based models 210. Additional or different frame-based models may be implemented for different applications or purposes.

Figure 4:
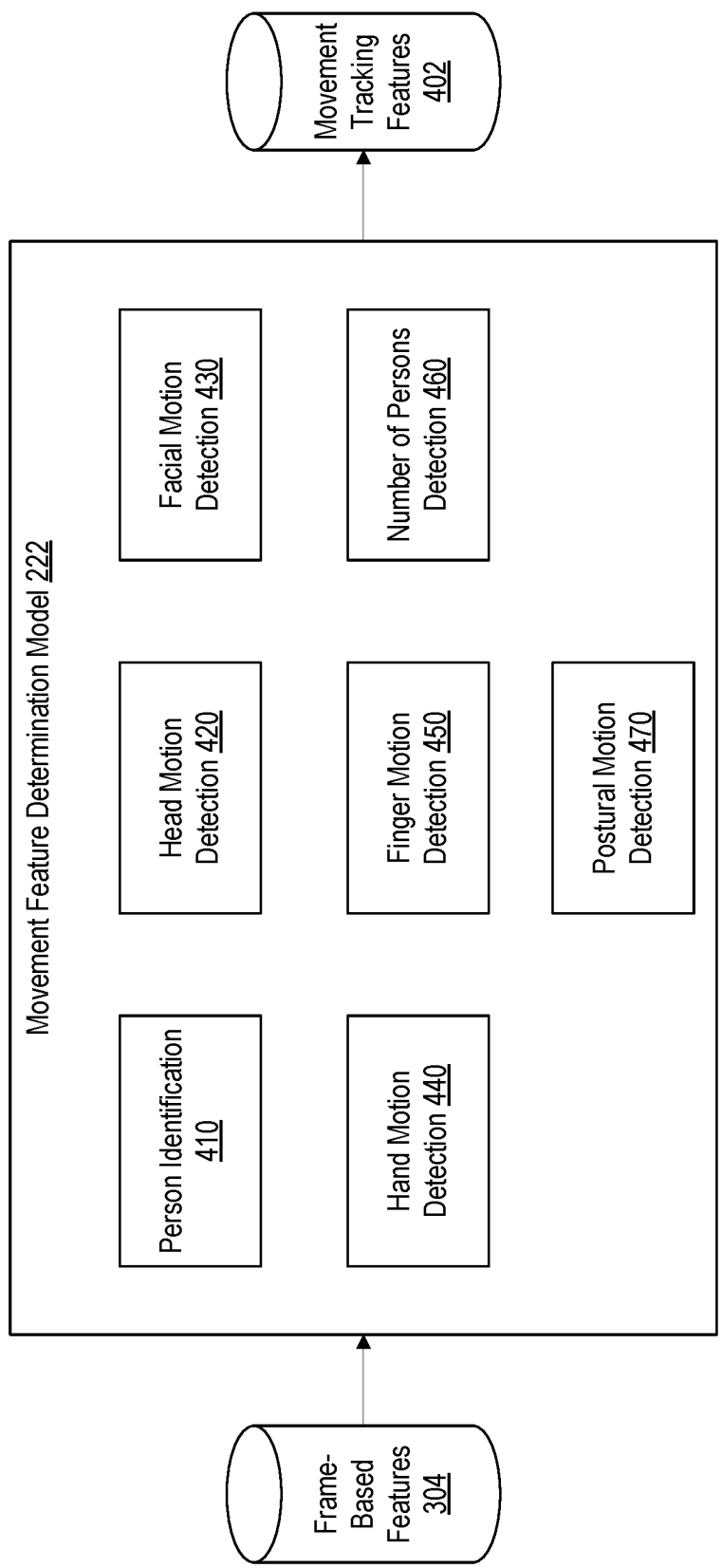
FIG. 4 is a block diagram illustrating components of one or more movement feature determination models in accordance with an embodiment.

FIG. 4 is a block diagram illustrating components of the one or more movement tracking models 222 in accordance with an embodiment. The one or more movement tracking models 222 are configured to receive the frame-based features 304 (generated by the one or more frame-based feature extraction models 210) to generate one or more movement tracking features 402. In some embodiments, the one or more movement tracking models 222 may include (but are not limited to) a person identification model 410, a head motion detection model 420, a facial motion detection model 430, a hand motion detection model 440, a finger motion detection model 450, a number of persons detection model 460, and/or a postural motion detection model 470.

In some embodiments, the person identification model 410 is configured to identify each person in visual data taken by the sensor 110 and associate visual data of a same person taken at different times. In some embodiments, the person identification model 410 use the facial landmark features generated by the one or more facial landmark detection models 330 and distances therebetween determined by the distance detection model 360 to obtain certain facial features of each person, and identify each person based on their facial features.

The number of persons detection model 460 is configured to determine a number of persons in a group or an environment. In some embodiments, the number of persons detection model 460 is further configured to detect each person's relative orientations and distance from one or more other persons.

In some embodiments, the head motion detection model 420 is configured to detect a head motion of a person (such as head nodding, head shaking, head turning, etc.), and the facial motion detection model 430 is configured to detect a facial motion of a person (such as mouth opening, eyes blinking, smiling, laughing, frowning, etc.). In some embodiments, the head motion detection model 420 and/or the facial motion detection model 430 further analyze the facial landmarks identified by the one or more facial landmark detection models 330, and track movements of the facial landmarks in a plurality of sequentially taken visual data. The head motion detection model 420 is configured to identify a head motion of a person, and the facial motion detection model 430 is configured to identify a facial motion of the person based on tracking of the facial landmarks of the plurality of sequentially taken visual data. The identified head motion and/or facial motion corresponding to each identified person are then output as one or more movement tracking features 402.

In some embodiments, the hand motion detection model 440 is configured to detect a hand motion of a person (waiving, high-five, punching, etc.), the finger motion detection model 450 is configured to detect a finger motion of a person (pointing gesture, thumbs-up gesture, thumbs-down gesture, middle finger gesture, etc.), and the posture motion detection model 370 is configured to detect a posture motion of a person. In some embodiments, the hand motion detection model 440 and/or the finger motion detection model 450 further analyze the hand landmarks identified by the one or more hand landmark detection models 340, and track movements of the hand landmarks in a plurality of sequentially taken visual data. The identified hand motion and/or finger motion corresponding to each identified person are then output as one or more movement tracking features 402. The posture motion detection model 470 is configured to analyze body landmarks identified by the body landmark detection model 320, and track movements of the body landmarks in a plurality of sequentially taken visual data.

Note, person identification model 410, head motion detection model 420, facial motion detection 430, hand motion detection model 440, finger motion detection model 450, number of persons detection model 460, and/or postural motion detection 470 illustrated in FIG. 4 are merely a few examples of movement tracking models 222. Additional or different movement tracking models may be implemented for different applications or purposes.

In some embodiments, the movement tracking features 402 generated by the machine learning models 410, 420, 430, 440, 450, 460, 470 can then be taken as input by the one or more semantic action detection models 224 to generate a third set of semantic action features.

Figure 5:
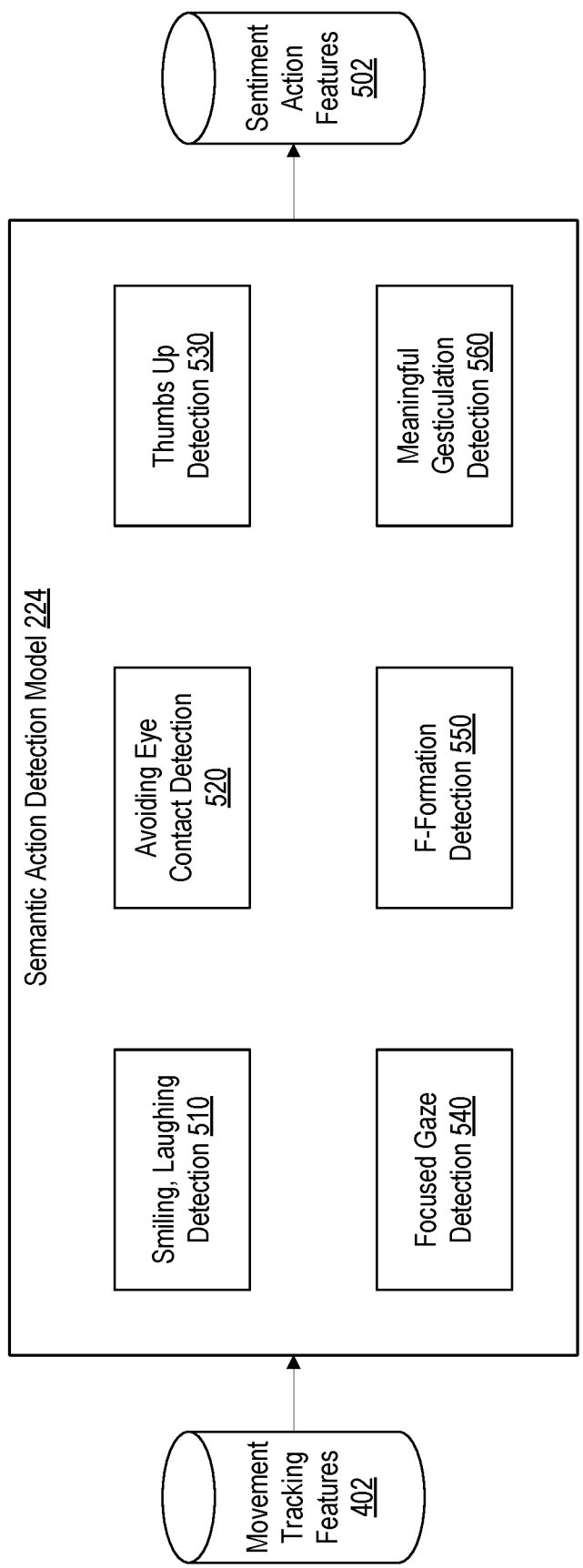
FIG. 5 is a block diagram illustrating components of one or more semantic action detection models in accordance with an embodiment.

FIG. 5 is a block diagram illustrating components of the one or more semantic action detection models 224 in accordance with an embodiment. The one or more semantic action detection models 224 are configured to receive the movement tracking features 402 (generated by the one or more movement tracking models 222) to generate one or more semantic action features 502. In some embodiments, the one or more semantic action detection models 224 includes a smiling/laughing detection model 510, an avoiding eye contact detection model 520, a thumbs up detection model 530, a focused gaze detection model 540, an F-formation detection model 550, and/or one or more other meaningful gesticulation detection models 560 (such as a thumbs down detection model, frowning detection model, etc.).

Note, smiling/laughing detection model 510, avoiding eye contact detection model 520, thumbs up detection model 530, focused gaze detection model 540, F-formation detection model 550 are merely a few examples of semantic action detection models 224. Additional or different semantic action detection models may be implemented for different applications or purposes.

In some embodiments, the smiling/laughing detection model 510 is configured to detect a smile and/or laugh, the avoiding eye contact detection model 520 is configured to detect an avoiding eye contact motion, and/or the focused gaze detection model 540 is configure to detect a focused gaze motion based on the one or more facial movement features generated by the facial motion detection model 430. The thumbs up detection model 530 is configured to detect a thumbs up motion based on finger motion features detected by the finger motion detection model 450. The detected smiling/laughing motions, avoiding eye contact motions, focused gaze motions, and/or the thumbs up/down motions are then output as one or more semantic action features 502.

The F-formation detection model 550 is configured to detect an F-formation based on the features identified by person identification model 410 and/or number of persons detection model 460. An F-formation is a social construct that describes distances and relative body orientations among a group of persons. For example, the F-formation detection model 550 is configured to identify a F-formation of a group of persons based on each of person's orientation, and distances therebetween. In some embodiments, for a group of persons to form an F-formation, they need to be within a predetermined distance and/or facing at each other. For example, a person that is facing a group of persons, but further away from the predetermined distance, would not be deemed as a part of the F-formation. As another example, a person that is within the predetermined distance, but faces away from the group would also not be deemed as a part of the F-formation. The detected F-formation (including orientations of each person in the F-formation group, and/or their distances therebetween) are then output as one or more semantic action features.

The semantic action features of the persons in the F-formation would provide additional meaning. For example, when a first person is avoiding eye contact of a second person, but not a third person in the F-formation, this may indicate a special emotion between the first person and a second person. As another example, when a first person smiles a lot at a second person, but not at a third person in the F-formation, this may also indicate a special emotion between the first person and the second person.

In some embodiments, the semantic action features 502 generated by the one or more semantic action detection models 224 can then be sent to the one or more social context detection models 226 and/or one or more social behavior detection models 228 to generate a fourth set of social context features and/or socially meaningful behaviors features. In some embodiments, additional data associated with a location where the visual data 302 are taken and/or the activity associated therewith may also be part of the input in generating the fourth set of social context features and/or socially meaningful behaviors features.

Additional details and/or different embodiments related to movement features determination models and semantic action detection models are described in the following applications, (1) U.S. Ser. No. 16/219,566, filed Dec. 13, 2018, (2) U.S. Ser. No. 16/857,645, filed Apr. 24, 2020, and (3) U.S. Ser. No. 17/011,854, filed Sep. 3, 2020, each of which is assigned to a common assignee and is incorporated by reference in their entirety.

Figure 6:
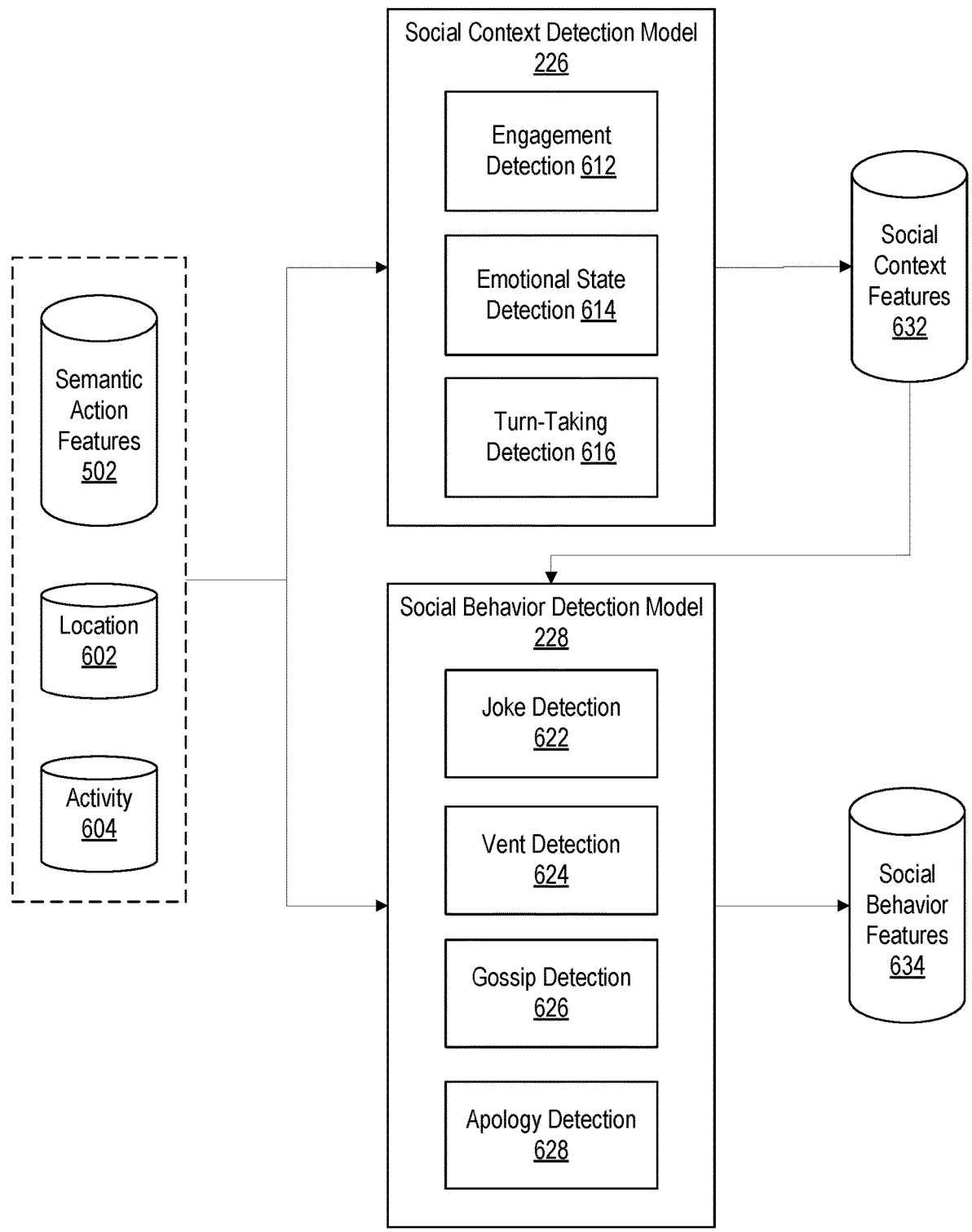
FIG. 6 is a block diagram illustrating components of one or more social context detection models and/or social behavior detection model in accordance with an embodiment.

FIG. 6 is a block diagram illustrating components of the one or more social context detection models 226 and/or social behavior detection model 228 in accordance with an embodiment. Both the one or more social context detection models 226 and one or more social behavior detection models 228 are configured to receive the one or more semantic action features 502, location data 602 indicating a location where the visual data 302 are taken, and activity data 604 indicating an activity associated with the visual data 302. The location data 602 may be obtained from a GPS and/or IP address of the camera, or GPSs and/or IP addresses of mobile devices of persons at the location. The activity data 604 may be obtained from a user input, a social media post, a calendar, and/or any other online sources. In some embodiments, the one or more social behavior detection models 228 further takes the output of the one or more social context detection models 226 as its input to generate output. The one or more social context detection models 226 are configured to generate one or more social context features 632, and the one or more social behavior detection models 228 are configured to generate one or more social behavior features 634.

In some embodiments, the one or more social context detection models 226 includes an engagement detection model 612, an emotional state detection model 614, and/or a turn-taking detection model 616. The engagement detection model 612 is configured to detect whether a person is engaged in a conversation with another person or a group of persons or a level of engagement of each person participating in a conversation. The emotional state detection model 614 is configured to detect an emotional state of a person, such as fear, anger, joy, sad, etc. The turn-taking detection model 616 is configured to detect whether a group of persons are taking turns doing something, such as taking turns to say something. The detected engagement, emotional state, and/or turn-taking pattern may then be output as one or more social context features 632.

In some embodiments, one or more social behavior detection models 228 includes a joke detection model 622, a vent detection model 624, a gossip detection model 626, and/or an apology detection model 628. The joke detection model 622 is configured to detect whether a person is telling a joke, which may be based on both the joke telling person's and joke listeners' semantic action features 502 and/or their social context features 632. For example, joke telling may involve one person telling a joke, and the joke telling person may or may not smile or laugh, while one or more listeners are smiling or laughing.

The vent detection model 624 is configured to detect whether a person is venting, which may also be based both on the venting person's and vent listeners' semantic action features 502 and/or their social context features 632. For example, the venting person may talk more than the listeners with an angry and/or sad emotion states, while the listeners may nod during the listening to the vent with an emotion state mirroring the venting person.

The gossip detection model 626 is configured to detect whether a group of persons are gossiping, which may be based on the group of persons' semantic action features 502 and/or their social context features 632. For example, gossiping may involve taking turns to talk, and/or the group of gossiping persons may show various emotion states, such as being surprised, sad, and/or laughing, etc.

The apology detection model 628 is configured to detect whether a person is apologizing to another person, which may be based on both the apologizer and the apology receiver's semantic action features 502 and/or their social context features 632. For example, the apologizer may talk more than the apology receiver in a sad emotion state, while the apology receiver may be in an angry emotion state or no emotion at all.

The location and the activity also provide additional insights to the social context features and the socially meaningful behaviors features. For example, when the group of persons is in a private venue, such as in someone's home, certain F-formation may be more likely to be categorized as gossip. On the other hand, when the group of persons is in a public venue, such as a conference center, certain F-formation may be less likely to be categorized as gossip.

The detected joke telling, venting, gossiping, and/or apologizing behaviors may then be output as one or more socially meaningful behaviors features 634. The social context features 632 (generated by the one or more social context detection models 226) and/or one or more socially meaningful behaviors features 634 (generated by one or more social behavior detection models 228) can then be taken as input by sentiment detection/prediction model 230 to detect or predict a sentiment of a person. In some embodiments, additional data associated with a location where the visual data 302 are taken and/or the activity associated therewith may also be part of the input in detecting the intent and/or personal trait of a person.

Note, engagement detection model 612, emotional state detection model 614, turn-taking detection model 616, joke detection model 622, vent detection model 624, gossip detection model 626, and/or apology detection model 628 are merely a few examples of the social context detection models 226 and/or social behavior detection models 228. Additional or different social context detection models and/or social behavior detection models may be implemented for different applications or purposes.

Figure 7:
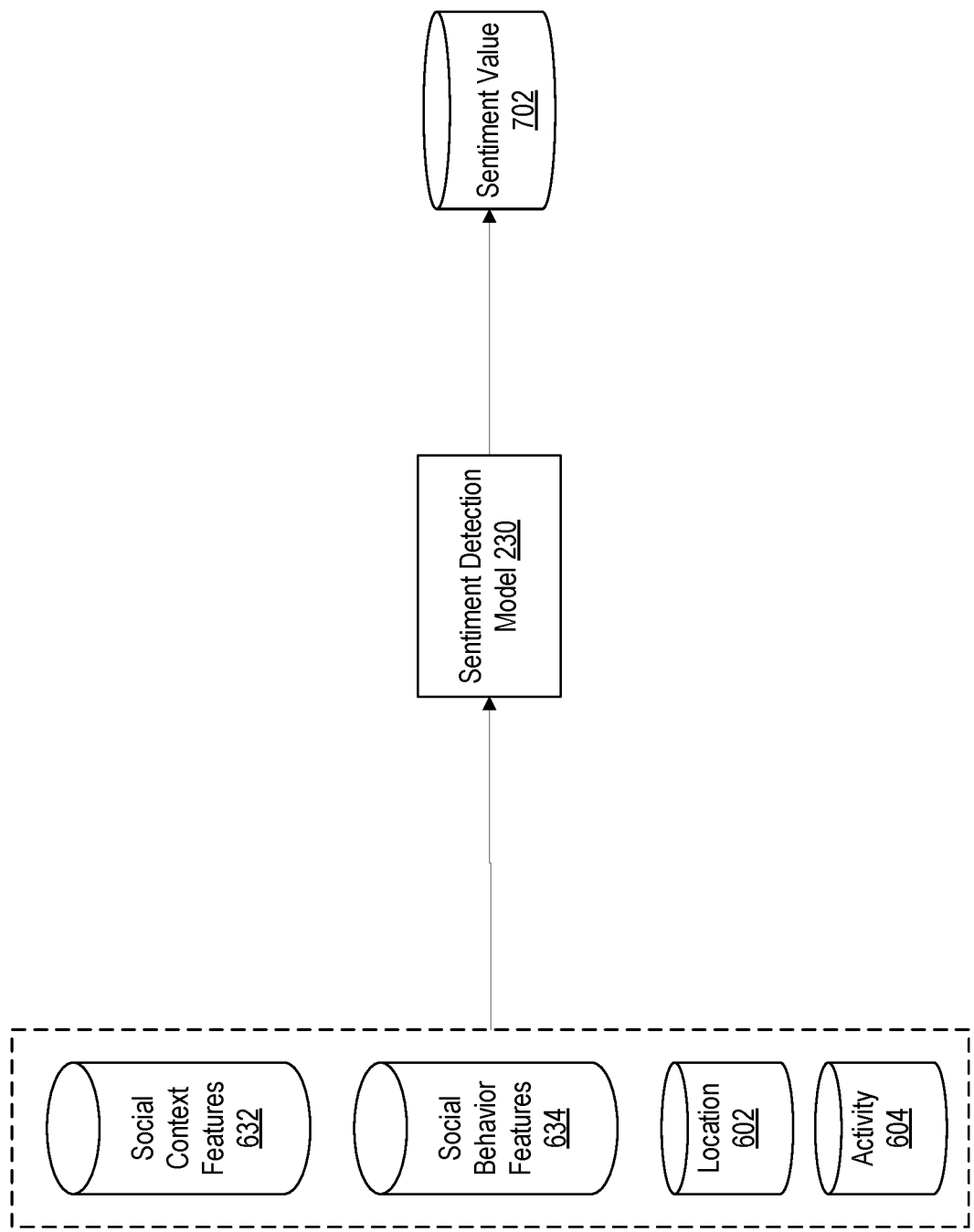
FIG. 7 is a block diagram illustrating components of sentiment detection/prediction model and personality trait detection model in accordance with an embodiment.

FIG. 7 is a block diagram illustrating components of sentiment detection/prediction model 230 in accordance with an embodiment. The sentiment detection/prediction model 230 is configured to receive the social context features 632 (generated by one or more social context detection models 226), the one or more socially meaningful behaviors features 634 (generated by one or more social behavior detection models 228), the location data 602, and/or the activity data 604 to generate a sentiment value 702.

In some embodiments, the sentiment detection/prediction model 230 are trained over a dataset containing a set of their social context features, a set of one or more socially meaningful behaviors features, location data and/or activity data, labeled with an intent and/or a personal trait. An intent may be (but is not limited to) one of interested, not interested, like, dislike, annoyed, amused, etc. A personal trait may be (but is not limited to) one of a level of openness, a level of extroversion or introversion, etc.

The sentiment detection/prediction model 230 is trained to receive any given set of social context features, socially meaningful behaviors features, location data, and/or activity data as input, to generate an output, detecting a sentiment value 702 of a person. In some embodiments, the value 702 may be a binary value, indicating a positive or negative feeling, for example 0 represents a negative feeling, and 1 represents a positive feeling. In some embodiments, sentiment value 702 may be a range of values, indicating a level of interest, for example 0 represents not interested at all, and 10 represents most interested. In some embodiments, sentiment value 702 may include a plurality of values, each representing an aspect of intent. For example, a first value may indicate a level of interest, and a second value may indicate a level of like or dislike.

As another example, the sentiment value 702 may be a binary value indicating introversion or extroversion of a person. For example, 0 represents introversion, and 1 represents extroversion. In some embodiments, sentiment value 702 may be a range of values, indicating a level of extroversion or introversion. For example, 0 represents most introversion, 1 represents most extroversion, and a number between 0 and 1 represents a personality with some level of introversion and extroversion. In some embodiments, personality trait value 704 may include a plurality of values, each representing a different personality trait. For example, a first value may indicate a level of openness (indicating a likelihood of accepting new things or concepts), and a second value may indicate a level of extroversion or introversion.

In some embodiments, the sentiment value 702 may indicate other types of sentiments, such as goals, motives, beliefs, and/or social interactions. For example, an organization may want to better understand the personalities of their team members, or better understand whether two persons are likely to work well together.

In some embodiments, the sentiment value 702 is further used in other applications to generate additional output. For example, a smart TV may use the sentiment value 702 to recommend additional programs to users.

Exemplary Use Cases

Figure 8:
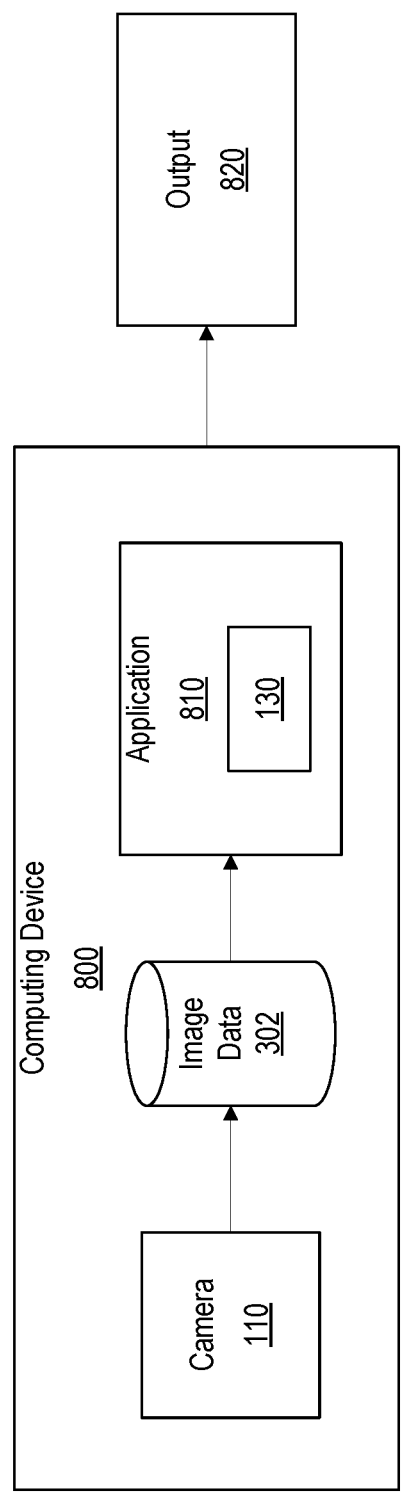
FIG. 8 is a block diagram illustrating a computing device having an application installed thereon that includes the sentiment detection and prediction system configured to analyze visual data to detect or predict a sentiment of a person in accordance with an embodiment.

FIG. 8 is a block diagram illustrating a computing device 800 (which may correspond to the computing device 140 or 150 of FIG. 1B or 1C) having an application 810 installed thereon that includes the sentiment detection and prediction system 130 configured to analyze visual data 302 in accordance with an embodiment. In some embodiments, the computing device 800 includes a sensor 110 embedded therein configured to generate the visual data 302. In some embodiments, the computing device 800 is configured to receive visual data 302 from an external sensor via a network 120.

The sentiment detection and prediction system 130 is configured to analyze the visual data 302 captured by the sensor 110 to generate analytics results, which include sentiment value 702, social context features 632, socially meaningful behaviors features 634, semantic action features 502, etc. The application 810 is configured to use analytics results generated by the sentiment detection and prediction system 130 to generate an output 820. The output 820 is associated with a function of the computing device 800. The computing device 800 may be a delivery robot, augmented reality glasses, a smart TV, a game console, an assistive camera, a safety camera, an in-cabin cameras in a vehicle (such as trains, buses, autonomous vehicles), a doorbell camera, a safety camera in a hospital, an athlete training system, a live event monitoring system, a VR headset, a social media platform, a smartphone, a smart coffee maker, etc.

In some embodiments, the computing device 800 is a delivery robot. The delivery robot may include a camera configured to take visual data of its surrounding area, where there may be pedestrians on a sidewalk. The sentiment detection and prediction system 130 is configured to analyze the visual data to identify the sentiment value 702 associated with the pedestrians. The application 810 is configured to use the sentiment value 702 detected by the sentiment detection and prediction system 130 to generate output 820, which may include communications to the pedestrians, such as apologies for the inconvenience caused by the robot or invitations to interact therewith. The output 820 may also include routes for the delivery robot. For example, when the sentiment value 702 indicates that a person is annoyed by the delivery robot, the delivery robot may generate an apology signal, apologizing to the person. In some embodiments, the delivery robot may also generate a route to avoid walking next to the person for a prolonged period. As another example, when the sentiment value 702 indicates that a person (e.g., a child) is interested in the delivery robot, the delivery robot may generate an invitation or smiley face, inviting the person to interact with the delivery robot; the delivery robot may also generate a route to walk closer to the person.

In some embodiments, the computing device 800 is a pair of augmented reality (AR)/virtual reality (VR) glasses or an AR/VR headset. The augmented reality glasses may include a sensor 110 taking visual data of the surrounding areas, the virtual environment, or the users' eyes. The sentiment detection and prediction system 130 is configured to generate analytics results based on the visual data taken by the sensor 110. The application 810 can then use the analytics results to generate recommendations to the user, putting itself on not-disturb mode, muting sound, generating status updates, and/or suggesting social media posts, etc.

In some embodiments, the AR/VR headset and/or a game console allow a user to experience a virtual environment in a metaverse. In some embodiments, the AR/VR headset is configured to capture each user's eyes or facial expressions as visual data, and/or a camera coupled to the game console is configured to capture the user's body movement as visual data. The AR/VR headset and/or the game console are configured to transmit the visual data to the metaverse platform. The metaverse platform is configured to analyze the visual data to identify an intent or personality of each user, and generate a virtual representation of each user based on the identified sentiment of the corresponding user. In some embodiments, the metaverse platform is further configured to modify the virtual environment, and/or generate suggestions for certain users based on the analysis results. Alternatively, or in addition, the AR/VR headset may be configured to analyze visual data representing the virtual environment in the metaverse to identify a sentiment of a virtual person in the metaverse, and generate recommendations to a user.

In some embodiments, the computing device 800 is a smart TV. The smart TV may include a sensor 110 to take visual data of a surrounding area, where viewers may be present. The sentiment detection and prediction system 130 may analyze the visual data to generate analytics results associated with the viewers. The application 810 may then use the analytics results to recommend certain applications, activities, TV programs, movies, and/or music to the viewers. The smart TV may also adjust the volume based on social interactions in front of the TV, inform virtual programs of the public's reaction to content, and/or change the content for the individual viewer or the entire program.

In some embodiments, the computing device 800 is a game console. The game console may include a sensor 110 configured to take visual data of a surrounding area, where one or more game players may be present. The sentiment detection and prediction system 130 may analyze the visual data to generate analytics results associated with the game players. The application 810 may then use the sentiment value 702 to recommend specific games, or activities within a game to the game players. The game console may also change a level of complexity of a game based on the analytics results. The game console may also use the analytics results to inform a specific game player, and provide feedback to game developers, and/or multiplayer communities.

In some embodiments, the computing device 800 is an assistive camera in a restaurant, a bar, a supermarket, or a shop. The assistive camera takes visual data of the restaurant, the bar, the supermarket, or the shop, where customers may be present. The sentiment detection and prediction system 130 may analyze the visual data to generate analytics results associated with the customers. The application 810 may then use the analytics results to identify whether a customer needs to be served or assisted. The application 810 may then notify an employee responsive to detecting a customer in need, such that customer experience may be improved.

In some embodiments, the computing device 800 is a safety camera in an environment (such as a factory, a construction site, or a distribution center), in which safety and/or health are critically important. The safety camera takes visual data of the environment, where workers may be present. The sentiment detection and prediction system 130 analyzes the visual data associated with the workers to generate analytics results associated with the workers. The application 810 can then use the analytics results associated with the workers to identify a worker's mental state, and/or determine whether a worker is in distress or need assistance. The application 810 may also notify a safety officer in response to detecting that a worker is in distress and/or need assistance, and the safety officer may then check on the worker.

In some embodiments, the computing device 800 is an in-cabin camera in a vehicle (such as a train, a bus, or an autonomous vehicle). The in-cabin camera takes visual data of the interior space of the vehicle, where passengers may be present. The sentiment detection and prediction system 130 analyzes the visual data to generate analytics results associated with the passengers. The application 810 may then use the analytics results to determine whether a passenger needs assistance. It is particularly beneficial in autonomous vehicles where there may not be drivers to take responsibility for situations.

In some embodiments, the computing device 800 is a doorbell camera. The doorbell camera takes visual data of visitors (which may be a mailman, a friend, a stranger, etc.). The sentiment detection and prediction system 130 analyzes the visual data of the visitors to generate analytics results associated with the visitor. The application 810 may then use analytics results to generate a suggestion to a resident. For example, in some embodiments, the application 810 may suggest whether the resident should come to the door or respond remotely.

In some embodiments, the computing device 800 is a safety camera in a hospital or a care home. The safety camera takes visual data of an area in the hospital or the care home where a patient is present. The sentiment detection and prediction system 130 analyzes the visual data of the patient to generate analytics results associated with the patient. The application 810 may then use the sentiment value 702 to determine whether the patient needs assistance. In response to determining that the patient needs assistance, the application 810 may then notify appropriate healthcare professionals.

In some embodiments, the computing device 800 is a video analytic system of a gym or a sports training facility. The video analytic system includes a camera that takes visual data of the facility where athletes and coaches are present. The sentiment detection and prediction system 130 analyzes the visual data of the athletes and/or coaches to generate analytics results associated with the athletes and/or coaches. The application 810 may then use the analytics results to determine whether an athlete or a coach needs assistance. In response to determining that an athlete or a coach needs assistance, the application 810 may then notify appropriate personnel.

In some embodiments, the computing device 800 is a live event monitor configured to take visual data of a live event where participants are present. The sentiment detection and prediction system 130 is configured to analyze the visual data of the participants to generate analytics results associated with at least some participants. The application 810 may then use the analytics results to gauge audience engagement, and/or suggest activities to improve audience engagement.

In some embodiments, the computing device 800 is a retail or wayfinding robot. The robot includes a sensor 110 configured to take visual data of a surrounding area where customers may be present. The sentiment detection and prediction system 130 is configured to analyze the visual data of the customers to generate analytics results. The application 810 may then use the analytics results to determine whether a customer should be supported and dispatch the retail or wayfinding robot to help that customer.

In some embodiments, the computing device 800 is a smart phone. A camera of the smart phone is configured to take visual data of the user when the user is communicating with another user via the smart phone. The sentiment detection and prediction system 130 is configured to analyze the visual data of the user to generate analytics results. The application 810 may then use the analytics results to recommend certain applications to the user, configure certain settings of the smart phone, and/or input into certain applications for personalized AR filters.

Although, in the above-described use cases, the computing device 800 includes a camera that takes visual data in substantially real time, the camera is not required to be part of the computing device 800. The computing device 800 may or may not be in the environment where the visual data are taken. In some embodiments, the visual data are transmitted to the sentiment detection and prediction system 130, which performs the analysis to generate the analytic results and then transmits the analytic results back to the camera, a device in the environment, or a user device. For example, in some embodiments, the computing device 800 may be a social media platform configured to analyze media posts and visual data posted by users. The sentiment detection and prediction system 130 may analyze the visual data posted by users to generate analytic results. The application 810 may then use the analytics results to annotate and/or categorize relevant visual data together, or suggest future actions based on the understanding of social interaction with the imagery.

In some embodiments, when the sentiment detection and prediction system 130 is integrated in a computing device that is coupled to a camera, specialized hardware, such as AI processors, and/or firmware are implemented in the computing device to further improve the computation speed for real time image processing.

Training the Machine-Learning Network

Figure 9:
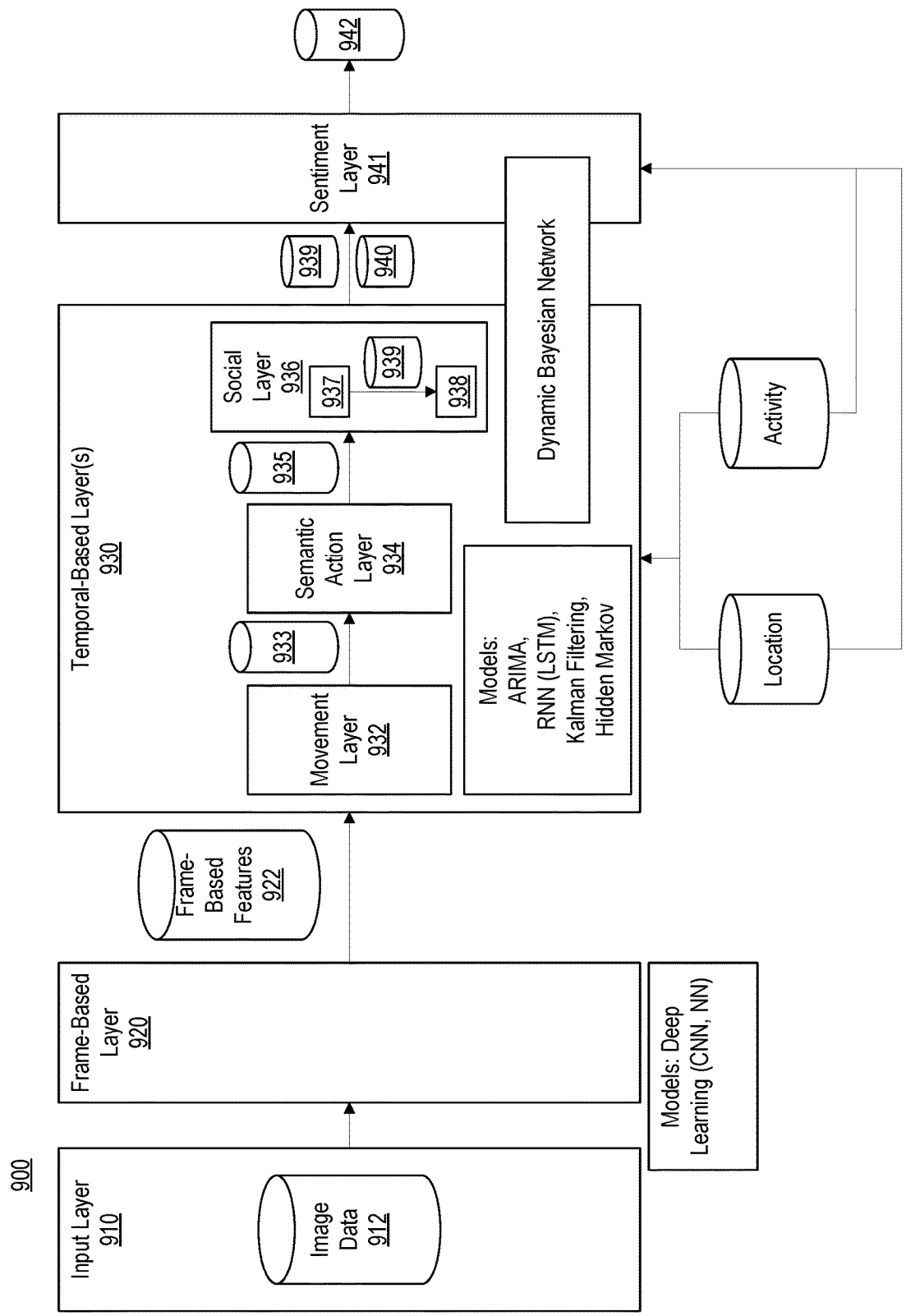
FIG. 9 is a block diagram illustrating a process of applying a sequence of AI models in the sentiment detection and prediction system.

As discussed above with respect to FIGS. 2-8, the sentiment detection and prediction system 130 includes a sequence of AI models. The sequence of AI models may include one or more machine learning models, and/or one or more statistical, probability, and/or logic models. FIG. 9 is a block diagram illustrating a sequence of AI models 900 that contains various models in the sentiment detection and prediction system 130. The sequence of AI models 900 includes an input layer 910, a frame-based layer 920, one or more temporal-based layers 930, and a sentiment layer 941. The input layer 910 is configured to input visual data (including a plurality of visual data, each including a plurality of pixel values) to the frame-based layer 920.

In some embodiments, the frame-based models are trained over labeled visual data 912. In some embodiments, the visual data 912 is labeled with various features, including (but not limited to) frame-based features, temporal-based features, intent features, and/or personality traits features. Frame-based features include (but are not limited to) objects, body landmarks, facial landmarks, hand landmarks, body orientation landmarks, and/or distances. Temporal-based features include (but are not limited to) movement features, semantic action features, and/or social behavior features. Movement features include (but are not limited to) head motion, hand motion, facial motion, and/or finger motion. Semantic action features include (but are not limited to) smiling, laughing, avoiding eye contact, thumbs up, focused gaze, F-formation, and/or other meaningful gesticulation. Social behavior features include (but are not limited to) social context features and socially meaningful behaviors features. Social context features include an engagement feature, an emotional state feature, a turn-taking feature. Social behaviors features include joke, vent, gossip, and/or apologize features. The intent features may include (but are not limited to) a level of interest. The personality traits features may include (but are not limited to) a level of openness, a level of introversion or extroversion.

In some embodiments, the frame-based layer 920 implements a deep learning network, such as a neural network (NN), and/or a convolutional neural network (CNN). The frame-base layer 920 is configured to extract frame-based features 922 and input the frame-based features 922 to the one or more temporal-based layers 930.

The one or more temporal-based layers 930 include a movement layer 932, a semantic action layer 934, and a social layer 936. The movement layer 932 is configured to receive at least a subset of the frame-based features 922 to detect movement features 933. In some embodiments, the frame-based features 922 are first filtered to generate a subset of the frame-based features 922, and movement layer 932 is configured to receive the subset of the frame-based features 922. The semantic action layer 934 is configured to receive at least a subset of the movement features 933 to detect semantic action features 935. In some embodiments, the movement features 933 are first filtered to generate a subset of the movement features 933, and semantic action layer 934 is configured to receive the subset of the movement features 933.

In some embodiments, the social layer 936 includes a social context sublayer 937 and a social behaviors sublayer 938. The social context sublayer 937 is configured to receive at least a subset of the semantic action features 935 to detect social context features 939. The social behaviors sublayer 938 is configured to receive at least a subset of the semantic action features 935 and a subset of social context features 939 to detect socially meaningful behaviors features 940. The sentiment layer 941 is configured to receive at least a subset of the social context features 939 and/or a subset of social behavior feature 940 to generate sentiment dat 942, detecting a sentiment of a person.

In some embodiments, the movement layer 932 and semantic action layer 934 include at least one of an autoregressive integrated moving average model (ARIMA), a recurrent neural network (RNN), a Kalman filter model, and/or a hidden Markov model. In some embodiments, the semantic action layer 934 and the social layer 936 further include a dynamic Bayesian network.

Computing Machine Architecture

Figure 10:
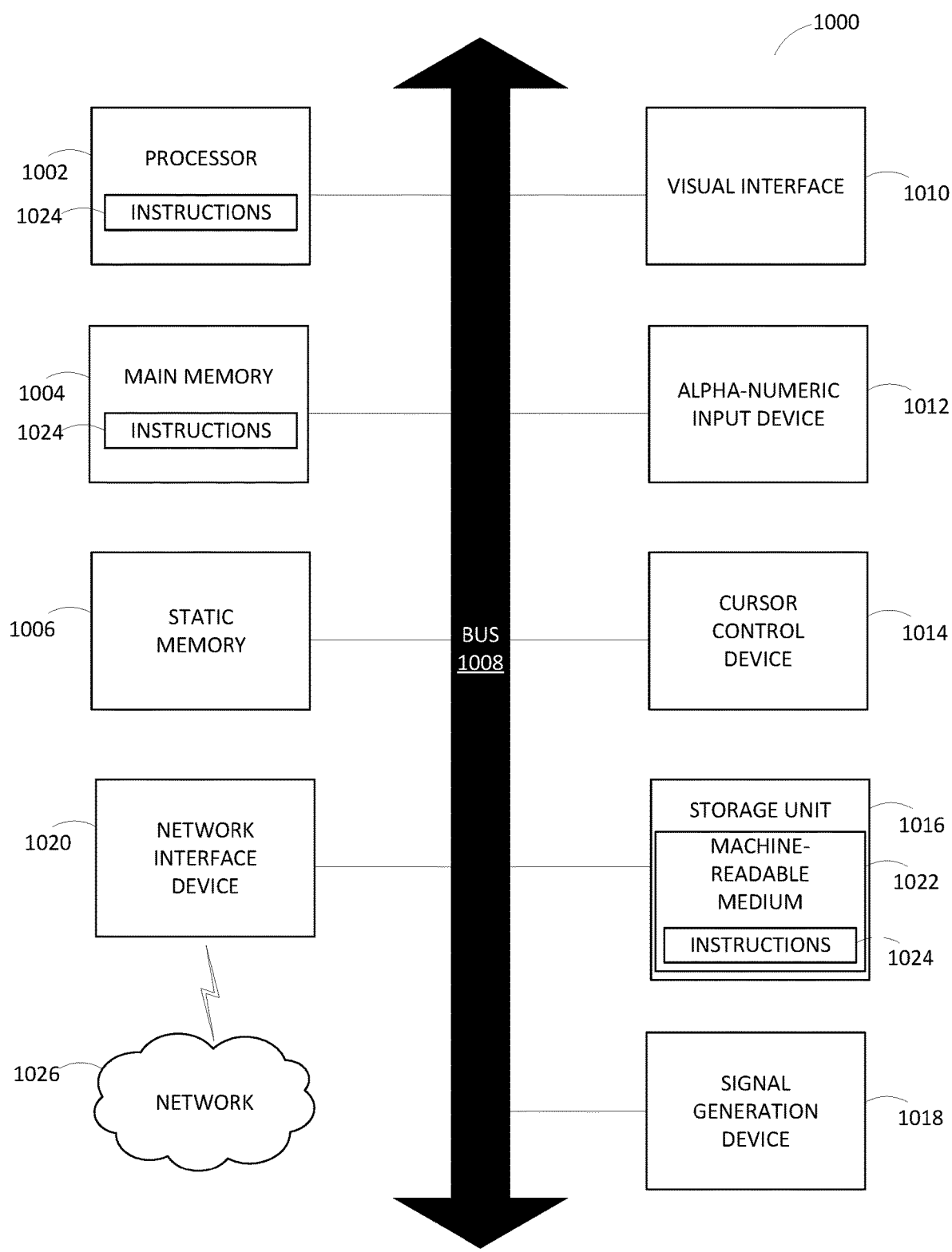
FIG. 10 is a block diagram illustrating components of an example machine or a computing device that is able to read instructions from a machine-readable medium and execute them in a processor (or controller).

FIG. 10 is a block diagram illustrating components of an example machine or a computing device that is able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of instructions 1024 executable by one or more processors 1002. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1004, and a static memory 1006, which are configured to communicate with each other via a bus 1008. The computer system 1000 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1010 may include or may interface with a touch enabled screen. The computer system 1000 may also include alphanumeric input device 1012 (e.g., a keyboard or touch screen keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Exemplary Process for Detecting a Sentiment of a Person

Figure 11:
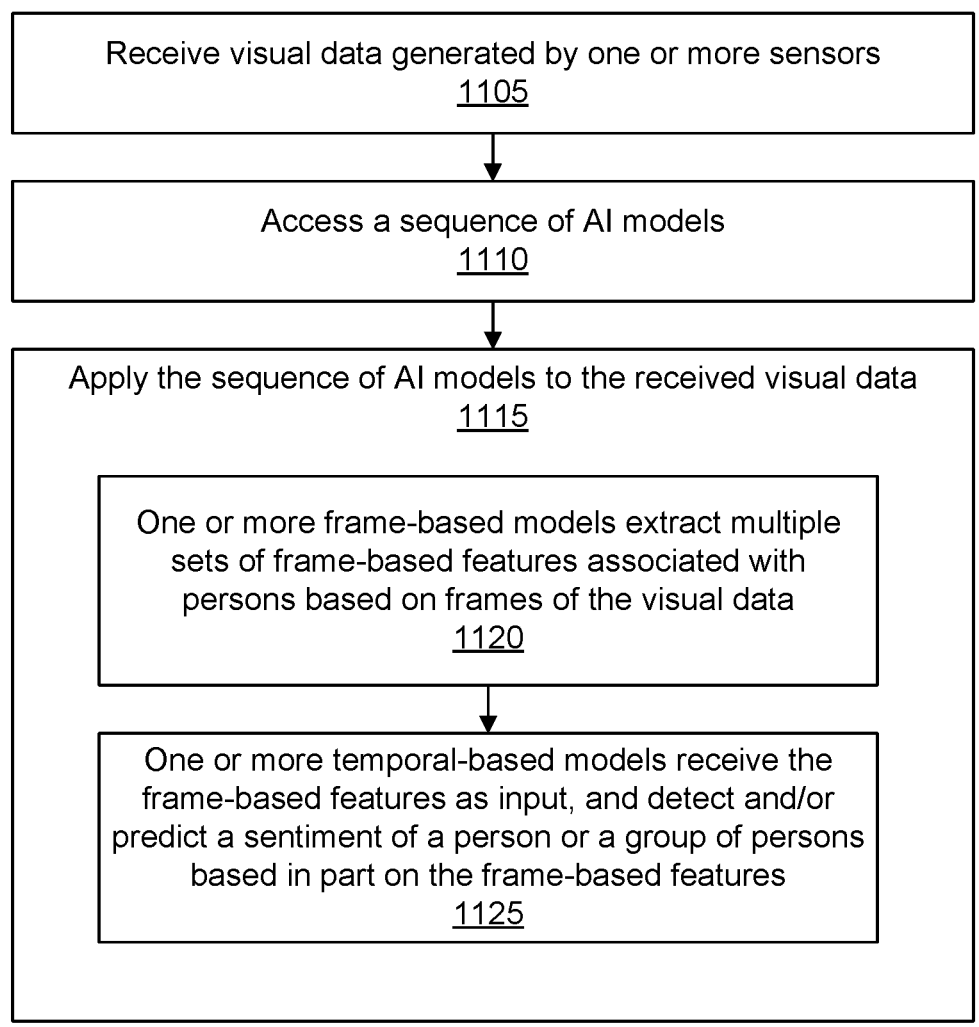
FIG. 11 is a flowchart of one embodiment of a method for detecting a sentiment of a person.

FIG. 11 is a flowchart of one embodiment of a method 1100 for detecting a sentiment of a person. The sentiment may include (but is not limited to) a goal, a motive, a belief, an intent, a personality trait, and/or a social interaction of a person or a group of persons. In various embodiments, the method includes different or additional steps than those described in conjunction with FIG. 11. Further, in some embodiments, the steps of the method may be performed in different orders than the order described in conjunction with FIG. 11. The method described in conjunction with FIG. 11 may be carried out by the sentiment detection and prediction system 130 in various embodiments, while in other embodiments, the steps of the method are performed by any online or offline system capable of obtaining and analyzing visual data.

The sentiment detection and prediction system 130 is configured to receive 1105 visual data of an environment captured by one or more sensors, wherein the environment has one or more persons therein. The sentiment detection and prediction system 130 is also configured to access 1110 a sequence of AI models (e.g., sequence of AI models 900). The sequence of AI models may include one or more machine-learning models and/or statistical, probability, and/or logic models. Outputs of earlier models in the sequence of models as inputs to one or more later models in the sequence.

The sentiment detection and prediction system 130 applies 1115 the sequence of AI models to the receive visual data to detect or predict a sentiment of a person in the environment. The sequence of models include one or more frame-based models (e.g. frame-based models 210) and one or more temporal-based models (e.g., temporal-based models 220). The one or more frame-based models are configured to extract 1120 multiple sets of frame-based features associated with one or more persons based in part on frames of visual data. The one or more temporal-based models are configured to receive the frame-based features as input, and detect and/or predict 1125 a sentiment of the one or more persons based in part on the one or more temporal-based models.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for selectively activating and de-activating a camera function of an application through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving visual data of an environment generated by one or more sensors;
   accessing a sequence of AI models, wherein outputs of earlier models in the sequence of AI models act as inputs to one or more later models in the sequence; and
   applying the sequence of AI models to the received visual data to detect or predict a sentiment of one or more persons in the environment, the sequence of AI models comprising:
   one or more frame-based models configured to receive frames of the visual data as input, and extract a plurality of sets of frame-based features associated with each of the one or more persons based in part on the frames of the visual data, each set of frame-based features in the plurality of sets of frame-based features corresponding to a particular frame of the visual data; and
   one or more temporal-based models configured to receive the plurality of sets of frame-based features as input, and detect or predict a sentiment of the one or more persons based in part on the plurality of sets of frame-based features,
   wherein the one or more temporal-based models include:
   a tracking model that is trained to take the plurality of sets of frame-based features as input, and to output a movement vector indicating motion of a given keypoint; the tracking model being further trained to output an identifier of a person based on the plurality of sets of frame-based features,
   a semantic model that is trained to take as input the identifier of the person and the movement vector of a keypoint associated with the person, and to output a behavior of the person, and
   a social context model that is trained to take as input the behavior of the person, and to output a social context of the person.

2. The method of claim 1, wherein the one or more frame-based models are applied at a first frequency, and wherein the one or more temporal-based models are applied at a second frequency that is lower than the first frequency.

3. The method of claim 1, wherein the one or more temporal-based models further include a social behavior model that is trained to take as input the social context of the person or the behavior of the person, and to output a socially meaningful behavior of the person.

4. The method of claim 3, wherein the sequence of AI models further include an intent model or a personality trait model that is trained to take as input the social context of the person or the socially meaningful behavior of the person, and to output a sentiment of the person.

5. The method of claim 4, wherein the social context model, the social behavior model, the intent model, or the personality trait model further takes location information as an input to generate a corresponding output.

6. A non-transitory computer-readable medium comprising memory with instructions encoded thereon, the instructions causing one or more processors to perform operations when executed, the instructions comprising instructions to:
   receive visual data of an environment generated by one or more sensors;
   access a sequence of AI models, wherein outputs of earlier models in the sequence of AI models act as inputs to one or more later models in the sequence; and
   apply the sequence of AI models to the received visual data to detect or predict a sentiment of one or more persons in the environment, the sequence of AI models comprising:
   one or more frame-based models configured to receive frames of the visual data as input, and extract a plurality of sets of frame-based features associated with each of the one or more persons based in part on the frames of the visual data, each set of frame-based features in the plurality of sets of frame-based features corresponding to a particular frame of the visual data; and
one or more temporal-based models configured to receive the plurality of sets of frame-based features as input, and detect or predict a sentiment of the one or more persons based in part on the plurality of sets of frame-based features,
wherein the one or more temporal-based models include:
a tracking model that is trained to take the plurality of sets of frame-based features as input, and to output a movement vector indicating motion of a given keypoint, the tracking model being further trained to output an identifier of a person based on the plurality of sets of frame-based features,
a semantic model that is trained to take as input the identifier of the person and the movement vector of a keypoint associated with the person, and to output a behavior of the person, and
a social context model that is trained to take as input the behavior of the person, and to output a social context of the person.

7. The non-transitory computer-readable medium of claim 6, wherein the one or more frame-based models are applied at a first frequency, and the one or more temporal-based models are applied at a second frequency that is lower than the first frequency.

8. The non-transitory computer-readable medium of claim 6, wherein the one or more temporal-based models further include a social behavior model that is trained to take as input the social context of the person or the behavior of the person, and to output a socially meaningful behavior of the person.

9. The non-transitory computer-readable medium of claim 8, wherein the sequence of AI models further include an intent model or a personality trait model that is trained to take as input the social context of the person or the socially meaningful behavior of the person, and to output a sentiment of the person.

10. The non-transitory computer-readable medium of claim 9, wherein the social context model, the social behavior model, the intent model, or the personality trait model further takes location information as an input to generate a corresponding output.

11. A computing system comprising:
a processor; and
a non-transitory computer-readable medium with instructions encoded thereon, the instructions causing one or more processors to perform operations when executed, the instructions comprising instructions to:
receive visual data of an environment generated by one or more sensors;
access a sequence of AI models, wherein outputs of earlier models in the sequence of AI models act as inputs to one or more later models in the sequence; and
apply the sequence of AI models to the received visual data to detect or predict a sentiment of one or more persons in the environment, the sequence of AI models comprising:
one or more frame-based models configured to receive frames of the visual data as input, and extract a plurality of sets of frame-based features associated with each of the one or more persons based in part on the frames of the visual data, each set of frame-based features in the plurality of sets of frame-based features corresponding to a particular frame of the visual data; and
one or more temporal-based models configured to receive the plurality of sets of frame-based features as input, and detect or predict a sentiment of the one or more persons based in part on the plurality of sets of frame-based features,
wherein the one or more temporal-based models include:
a tracking model that is trained to take the plurality of sets of frame-based features as input, and to output a movement vector indicating motion of a given keypoint, the tracking model being further trained to output an identifier of a person based on the plurality of sets of frame-based features,
a semantic model that is trained to take as input the identifier of the person and the movement vector of a keypoint associated with the person, and to output a behavior of the person, and
a social context model that is trained to take as input the behavior of the person, and to output a social context of the person.

12. The computing system of claim 11, wherein the one or more frame-based models are applied at a first frequency, and the one or more temporal-based models are applied at a second frequency that is lower than the first frequency.

* * * * *